US009124608B2

(12) United States Patent  
Jin et al.

(10) Patent No.: US 9,124,608 B2  
(45) Date of Patent: Sep. 1, 2015

(54) CONVEYING SESSION CONTINUITY INFORMATION IN A MULTI-COMPONENT COMMUNICATION SESSION

(75) Inventors: Haipeng Jin, Carlsbad, CA (US); Arungundram C. Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 12/484,790

(22) Filed: Jun. 15, 2009

(65) Prior Publication Data

US 2009/0319676 A1 Dec. 24, 2009

Related U.S. Application Data

(60) Provisional application No. 61/073,902, filed on Jun. 19, 2008.

(51) Int. Cl.  
H04L 29/06 (2006.01)  
H04L 29/08 (2006.01)  
H04W 80/10 (2009.01)  
H04W 76/02 (2009.01)

(52) U.S. Cl.  
CPC ....... H04L 65/1093 (2013.01); H04L 29/06027 (2013.01); H04L 65/1006 (2013.01); H04L 65/1016 (2013.01); H04L 65/1069 (2013.01); H04L 65/1096 (2013.01); H04L 65/60 (2013.01); H04L 67/14 (2013.01); H04W 76/022 (2013.01); H04W 80/10 (2013.01)

(58) Field of Classification Search  
None  
See application file for complete search history.

(56) References Cited

U.S. PATENT DOCUMENTS 6,011,909 A * 1/2000 Newlin et al. ................. 709/227  
7,178,047 B2 2/2007 Chandley  
7,228,415 B2 * 6/2007 Eschbach et al. ............. 713/162  
(Continued)

FOREIGN PATENT DOCUMENTS

CN 1486062 A 3/2004  
CN 1832414 A 9/2006  
(Continued)

OTHER PUBLICATIONS

3GPP: "3rd Generation Partnership Project;Technical Specification Group Services and Architecture;Feasibility Study on Multimedia Session Continuity; Stage 2(Release 8)" 3GPP Draft; 23893-200, 3rd Generation Partnership Project (3GPP), Mobile Competence Centre ; 650, Route Des Lucioles ; F-06921 Sophia-Antipolis Cedex; France, vol. TSG SA, no. Prague, Czech Republic; 20080602, Jun. 2, 2008, XP050211170 [retrieved on Jun. 2, 2008] Chapter 6.4.1, 6.5. 1.3, 6.5.2.4a,b.

(Continued)

Primary Examiner — Ario Etienne  
Assistant Examiner — Ho Shiu  
(74) Attorney, Agent, or Firm — Ashish L. Patel

(57) ABSTRACT

In a multimedia communication session with multiple media components, one or more media components can be transferred from one access network to another access network and yet maintain the continuity of the overall communication session. Each session is first identified and thereafter the media component intended to be transferred is also identified. The identities of the identified session and component are sent to one or more entities within the communication network for executing the media component transfer.

19 Claims, 9 Drawing Sheets

(56) References Cited

U.S. PATENT DOCUMENTS

| | | | |
|---|---|---|---|
| 7,574,202 B1* | 8/2009 | Tsao et al. | 455/411 |
| 2003/0088676 A1* | 5/2003 | Smith et al. | 709/227 |
| 2004/0002330 A1* | 1/2004 | Chitrapu | 455/426.2 |
| 2004/0030750 A1* | 2/2004 | Moore et al. | 709/204 |
| 2005/0185773 A1* | 8/2005 | Burger et al. | 379/88.22 |
| 2006/0026288 A1* | 2/2006 | Acharya et al. | 709/227 |
| 2006/0212511 A1* | 9/2006 | Garcia-Martin | 709/203 |
| 2006/0218399 A1* | 9/2006 | FitzGerald et al. | 713/168 |
| 2007/0058637 A1* | 3/2007 | Lo | 370/395.2 |
| 2007/0060123 A1* | 3/2007 | Maes | 455/432.1 |
| 2007/0147244 A1* | 6/2007 | Rasanen | 370/231 |
| 2007/0192410 A1* | 8/2007 | Liversidge et al. | 709/204 |
| 2008/0064394 A1* | 3/2008 | Maes | 455/432.1 |
| 2008/0080510 A1* | 4/2008 | Zancan | 370/392 |
| 2008/0102832 A1* | 5/2008 | Sengupta et al. | 455/435.2 |
| 2008/0123560 A1* | 5/2008 | Nassor et al. | 370/255 |
| 2008/0126549 A1* | 5/2008 | Khanchandani et al. | 709/227 |
| 2008/0160991 A1* | 7/2008 | Constantinof et al. | 455/426.2 |
| 2008/0281971 A1* | 11/2008 | Leppanen et al. | 709/228 |
| 2009/0017856 A1* | 1/2009 | Albertsson et al. | 455/518 |
| 2009/0111471 A1* | 4/2009 | Li et al. | 455/437 |
| 2009/0116628 A1* | 5/2009 | Ropolyi | 379/114.22 |
| 2009/0254666 A1* | 10/2009 | Agulnik et al. | 709/228 |
| 2009/0257433 A1* | 10/2009 | Mutikainen et al. | 370/392 |
| 2009/0323636 A1* | 12/2009 | Dillon et al. | 370/331 |
| 2010/0080133 A1* | 4/2010 | Oron | 370/252 |
| 2010/0121961 A1* | 5/2010 | Elleuch et al. | 709/228 |
| 2011/0113479 A1* | 5/2011 | Ganem | 726/9 |

FOREIGN PATENT DOCUMENTS

| | | |
|---|---|---|
| JP | 2005099980 A | 4/2005 |
| WO | WO2008048753 A1 | 4/2008 |
| WO | WO2009124943 A1 | 10/2009 |

OTHER PUBLICATIONS

Garcia-Martin Nokia M: "Input 3rd-Generation Partnership Project (3GPP) Release 5 Requirements on the Session Initiation Protocol (SIP); rfc4083.txt" IETF Standard, Internet Engineering Task Force, IETF, CH, May 1, 2005, XP015041916 ISSN: 0000-0003 paragraph [4.18.2].

International Search Report & Written Opinion PCT/US2009/048036, International Search Authority—European Patent Office—Dec. 10, 2009.

3GPP: "3rd Generation Partnership Project; Technical Specification Group Services and Architecture;IP Multimedia Subsystem (IMS) Sevice Continuity; Stage 2(Release 8)" 3GPP Draft; 23237-100, SRD Generation Partnership Project (3GPP), Mobile Competence Centre ; 650, Route Des Lucioles ; F-06921 Sophia-Antipolis Cedex; France, vol. TSG SA, no. Prague, Czech Republic; 20080602, Jun. 2, 2008, XP050211037 [retrieved on Jun. 2, 2008] Chapters 4.3.3, 6.3.1.1-4, 6.3.2.2.2, 6.3.2.3.1.

3GPP: "3rd Generation Partnership Project;Technical Specification Group Services and Architecture;Feasibility Study on Multimedia Session Continuity; Stage 2(Release 8)" 3GPP Draft; 23893-200, 3rd Generation Partnership Project (3GPP), Mobile Competence Centre ; 650, Route Des Lucioles ; F-06921 Sophia-Antipolis Cedex ; France, vol. TSG SA, no. Prague, Czech Republic; 20080602, Jun. 2, 2008, XP05021170 [retrieved on Jun. 2, 2008] Chapter 6.4.1, 6.5.1.3, 6.5.2.4a,b.

Handley UCL V Jacobs0n Packet Design C Perkins University of Glasgow M: "SDP: Session Description Protocol; draft-ietf-mmusic-rseebis-Ol.txt" SDP: Session Description Protocol; DRAFT-IETF-MMUSIC-RFC4566BIS-01.TXT, Internet Engineering Task Force, IETF.

Handley UCL V Jacobs0n Packet Design C Perkins University of Glasgow M: "SDP: Session Description Protocol; draft-ietf-mmusic-rseebis-Ol.txt" SDP: Session Descripton Protocol; DRAFT-IETF-MMUSIC-RFC4566BIS-01.TXT, Internet Engineering Task Force, IETF; Standardworkingdraft, Internet Society (ISOC) 4, Rue Des Falaises CH-1205 Geneva, Switzerland, vol. mmusic, No. 1, Jun. 8, 2008, XP015058552 paragraphs [04.1], [5.14].

Taiwan Search Report—TW098120668—TIPO—Aug. 29, 2012.

Taiwan Search Report—TW098120668—TIPO—Jun. 24, 2013.

Chen, M-X., et al., "Session mobility of SIP over multiple devices," Tridentcom 2008, Innsbruck, Austria, Mar. 18-20, 2008, 9 pp.

Oh Y. J. et al., "VoIP Service Technology Trends", Journal of the Korean Society of Broadcasting Engineers, Sep. 2005, vol. 10, No. 3, pp. 84-93.

3GPP "3rd Generation Partnership Project; Technical Specification Group Services and Architecture; IP Multimedia Subsystem (IMS) Service Continuity; Stage 2(Release 8)" 3GPP Draft; 23237-100, SRD Generation Partnership Project (3GPP), Mobile Competence Centre; 650, Route des Lucioles; F-06921 Sophia-Antipolis Cedex; France, vol. TSG SA, No. Prague, Czech Republic; Jun. 2, 2008, XP050211037 [retrieved on Jun. 2, 2008] Chapters 4.3.3, 6.3.1.1, 6.3.2.2.2, 6.3.2.3.1,.

3GPP "3rd Generation Partnership Project; Technical Specification Group Services and Architecture; Feasibility Study on Multimedia Session Continuity; Stage 2(Release 8)" 3GPP Draft; 23893-200, 3RD Generation Partnership Project (3GPP), Mobile Competence Centre; 650, Route des Lucioles; F-06921 Sophia-Antipolis Cedex; France vol. TSG SA, No. Prague, Czech Republic; Jun. 2, 2008, XP050211170 [retrieved on Jun. 2, 2008] Chapter 6.4.1, 6.5.1.3, 6.5.2.4a, b.

Handley UCL V Jacobson Packet Design C Perkins University of Glasgow M; "SDP: Session Description Protocol; draft-ietf-mmusic-rseebis-Ol.txt" SDP: Session Description Protocol; Draft-IETF-Mmusic-RFC4566BIS-01, Txt, Internet Engineering Task Force, IETF;.

* cited by examiner

SDP:
    . . . .
    . . . .
    m=audio  port#1000  RTP/AVP  codec ...
    m=video  port#1002  RTP/AVP  codec ...
    m=video  port#1004  RTP/AVP  codec ...
    . . . .
    . . . .

FIG. 7

SDP:
    . . . .
    . . . .
    m=video  port#2000  RTP/AVP  codec ...
    a=orig-mid: #3
    . . . .
    . . . .

FIG. 8

```
SDP:
    . . . .
    . . . .
    m=audio port#1000 RTP/AVP codec ...
    m=video port#1002 RTP/AVP codec ...
    m=video port#1004 RTP/AVP codec ...
    . . . .
    . . . .
```

FIG. 9

```
SDP:
    . . . .
    . . . .
    m=audio 0 RTP/AVP codec ...
    m=video 0 RTP/AVP codec ...
    m=video port#2008 RTP/AVP codec ...
    . . . .
    . . . .
```

FIG. 10

CONVEYING SESSION CONTINUITY INFORMATION IN A MULTI-COMPONENT COMMUNICATION SESSION

CLAIM OF PRIORITY UNDER 35 U.S.C §119

The present application for patent claims priority to U.S. Provisional Application No. 61/073,902, entitled "Conveying Session Continuity Information in a Multi-Component Communication Session," filed on Jun. 19, 2008, and assigned to the assignee hereof and expressly incorporated by reference herein.

BACKGROUND

I. Field

This invention generally concerns with communications, more particularly, it relates to exchanging and processing of information in a communication session with a plurality of session components.

II. Background

Advances in telecommunications allow multimedia sessions to be carried over the Internet via different network accesses. It is not unusual, for example, within one communication session, a plurality of session components are conducted through a single network access. For instance, in a communication session, a number of video and audio session components can be carried out simultaneously through a single network access. These multimedia session components are quite often data intensive. Occasionally, some session components need to be transferred to another network for various reasons. The reason can be due to, for instance, costs, availability of support, and network loading, etc.

Heretofore, transfers of session components among different networks have be problematic, if at all possible.

Accordingly, there is a need to provide an efficient scheme for the transfer of communication session components reliably so as to maintain continuity of communication sessions.

SUMMARY

In a multimedia communication session with multiple media components, one or more media components can be transferred from one access network to another access network and yet maintain the continuity of the overall communication session. Each session is first identified and thereafter the media component intended to be transferred is also identified. The identities of the identified session and component are sent to one or more entities within the communication network for executing the media component transfer.

These and other features and advantages will be apparent to those skilled in the art from the following detailed description, taken together with the accompanying drawings, in which like reference numerals refer to like parts.

BRIEF DESCRIPTION OF THE DRAWINGS

FIGS. 7 and 8 are simplified drawings of the body of an exemplary message exchanged among the various entities identifying the media component intended to be transferred;

FIGS. 9 and 10 are simplified drawings of the body of another exemplary message, as an alternative to the message shown in FIGS. 7 and 8, exchanged among the various entities identifying the media component intended to be transferred;

DETAILED DESCRIPTION

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

Furthermore, in the following description, for reasons of conciseness and clarity, terminology associated with the Wideband Code Division Multiple Access (WCDMA) standards, as promulgated under the $3^{rd}$ Generation Partnership Project (3GPP) by the International Telecommunication Union (ITU) is used. It should be emphasized that the invention is also applicable to other technologies, such as technologies and the associated standards related to Code Division Multiple Access (CDMA), Time Division Multiple Access (TDMA), Frequency Division Multiple Access (FDMA), Orthogonal Frequency Division Multiple Access (OFDMA) and so forth. Terminologies associated with different technologies can vary. For example, depending on the technology considered, a User Equipment (UE) used in the WCDMA standards can sometimes be called an Access Terminal (AT), a user terminal, a Mobile Station (MS), a subscriber unit, a User Equipment (UE), etc., to name just a few. Likewise, a Access Network (AN) used in the WCDMA standards can sometimes be called an access point, an Access Node (AN), a Node B, a Base Station (BS) and so forth. It should here be noted that different terminologies apply to different technologies when applicable.

Figure 1:
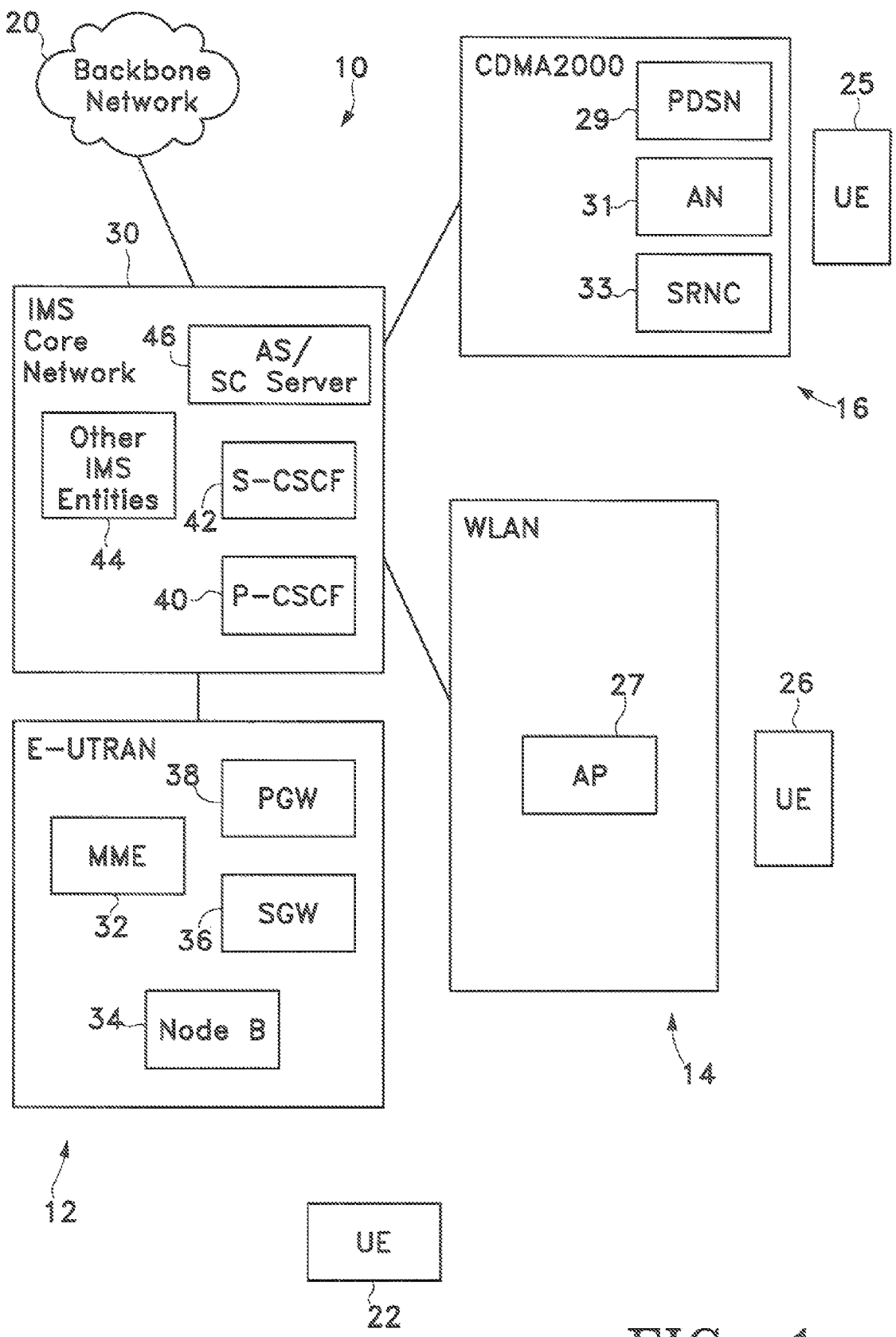
FIG. 1 is a simplified schematic drawing which shows the overall communication system in accordance with an exemplary embodiment of the invention.

Reference is directed to FIG. 1 which shows schematically the overall communication system signified by the reference numeral 10.

In FIG. 1, for the sake of simplicity and ease of description, the system 10 is shown as comprising three Access Networks (ANs) 12, 14 and 16.

In this example, the AN 12 is a Long Term Evolution (LTE) communication network capable of providing Internet Protocol (IP) connectivity to multimedia services offered by a IP Multimedia Subsystem (IMS) 30. The AN 12 comprises different network entities such as the Mobility Manager Entity (MME) 32, a Node B 34, a Serving Gateway (SGW) 36, and a PDN Gateway (PGW) 38. A user entity, such as the UE 22 which in a mobile device in this example, communicates with the Node B 34 wirelessly at the radio link level.

The AN 14 is a WLAN network, for example, a network operating under the IEEE 802.11 standards and other wireless local area network technologies. The AN 14 comprises, among other things, an Access Point (AP) 27. Another user entity, such as another UE 26 can communicate with the AP 27 wirelessly for access of a backbone network 20, for example.

The AN 16 is yet another network, for instance, a CDMA2000 network. The AN 16 includes, among other things, a Packet Data Service Node (PDSN) 29, and Access Node (AS) 31 and a Serving Radio Network Controller (SRNC) 33. As yet another user entity, such as another UE 25, can communicate with the AN 31 wirelessly for access of the backbone network 20, for instance.

In FIG. 1, all three ANs 12, 14 and 16 are linked to the IMS core network 30. The IMS core network 30 described in this embodiment is a network with an architectural format supported by various standard organizations, examples are the 3GPP, 3GPP2 ($3^{rd}$ Generation Partnership Project 2), IEEE (International Electrical and Electronic Engineers), etc., to name a few. The IMS core network 30 uses the IP protocols and is connected to the backbone network 20. The backbone network 20 can be the Internet or an intranet.

In FIG. 1, the UEs 22, 26 and 25 are illustrated as connected to the IMS core network 30 via the LTE AN 12, the WLAN AN 14, and the CDMA2000 AN 16, respectively. It should be understood that a single UE may gain access to the IMS core network 30 via one of, any of, or all of the ANs. For instance, the UE 22 can gain access to the IMS core network 30 via both the LTE AN 12 and the WLAN AN 14, simultaneously or at different time periods.

It should be noted that the types of ANs as described above are merely exemplary. Connections to the IMS core network 30 by other types of ANs are clearly possible.

In the following description, terminology and protocols associated with signaling and data exchanges according to the IMS standards are used. The fundamentals of the IMS standards can be found in a publication, entitled "Internet Protocol (IP) multimedia call control protocol based on Session Initiation Protocol (SIP) and Session Description Protocol (SDP)," 3GPP TS 24.229, published by the 3GPP.

Suppose initially, there is the UE 22 which corresponds with another UE 25 via the IMS core network 30. The UE 22 gains access to the IMS core network 30 through the AN 12. Likewise, the UE 25 gains access to the IMS core network 30 via the AN 16.

In the IMS core network 30, it includes a Proxy Call Session Control Function (P-CSCF) server 40, a Serving Call Session Control Function (C-CSCF) server 42, an Session Continuity (SC) Server (AS) 46 and other IMS entities 44. The Session Continuity (SC) server 46 is one type of application server within the IMS core network 30 that provides functionalities to allow seamless session transfer of communication sessions between different accesses. In this example, to maintain IMS session continuity, all the IMS sessions are anchored at the SC server 46.

In this exemplary embodiment, suppose initially the UE 22 is having an IMS session with the UE 25 with multiple multimedia components. In this specification and the appended claims, the term "multi" or "multiple" means more than one. As previously mentioned, the IMS session is anchored at the SC server 46. An example of such a session can be the UE 22 is conducting a video conference with the UE 25 having multiple voice and video streams. For purposes of description, suppose there are three session components, namely, voice #1, video #2, and video #3, in the communication session. For instance, video #2 can be a face-to-face video of the users of the UEs 22 and 25, and video #3 can be a product demonstration video of a product.

Hereinbelow, the terms "session component," "media component," "communication component," "multimedia component," and sometimes simply "component" are used interchangeably.

Suppose in this example, the UE 22 is mobile and capable of accessing multiple ANs, such as the ANs 12, 14 and 16. When the UE 22 is roaming among the different ANs, it is highly desirable for the UE 22 to be able to transfer an IMS communication session, or any component of the session, from one AN to another AN.

For purposes of illustration, suppose in the example, the UE 22 initially communicates with the UE 25 via the LTE AN 12 with the aforementioned three media components, voice #1, video #2 and video #3. When the UE 22 can gain access to the WLAN AN 14, the UE 22 can have the option of transferring the media component video #3 to the WLAN AN 14 but maintain the other media components voice #1 and video #2 with the LTE AN 12, as an example.

Described below are schemes for facilitating session and session component transfers from one AN to another AN via the SC server 46.

An IMS user entity, such as the UE 22, is allowed to establish multiple multimedia sessions with multiple correspondents as mentioned above. For instance, the UE 22 may have the above-mentioned IMS session with the UE 25, while at the same time, the UE 22 may also have another IMS session with the UE 26. To enable session transfer, all the multimedia sessions are anchored at the IMS SC server 46, which facilitates session transfer for the UE 22 in its home IMS network. When the UE 22 requests the SC server 46 to transfer some of the media components within the session currently in process with the UE 25 to one or more other ANs, the UE 22 needs to clearly identify and indicate that the session with the media components for the transfer as the intended session and not any other session. In this example, the intended session is the session the UE 22 communicating with the UE 25 with the three media components, voice #1, video #2 and video #3, as aforementioned. It is not any other session, if any, the UE 22 may also communicate with the UE 26, for instance.

In order to distinguish the different sessions, the IMS SC server 46 assigns a unique ID (Identity) to each session the UE 22 is conducting with a particular remote end user entity. This unique ID which is called a STI (Session Transfer Identifier) in this exemplary embodiment can take the following format: a URI (User Resource Identification) such as SIP (Session Initiation Protocol) URI, a telephone URI, a SIP dialog ID (Identifier) of the SIP dialog, and so forth. Describe below are schemes for transferring this identity information STI between the SC server 46 and the IMS UE 22.

Figure 2:
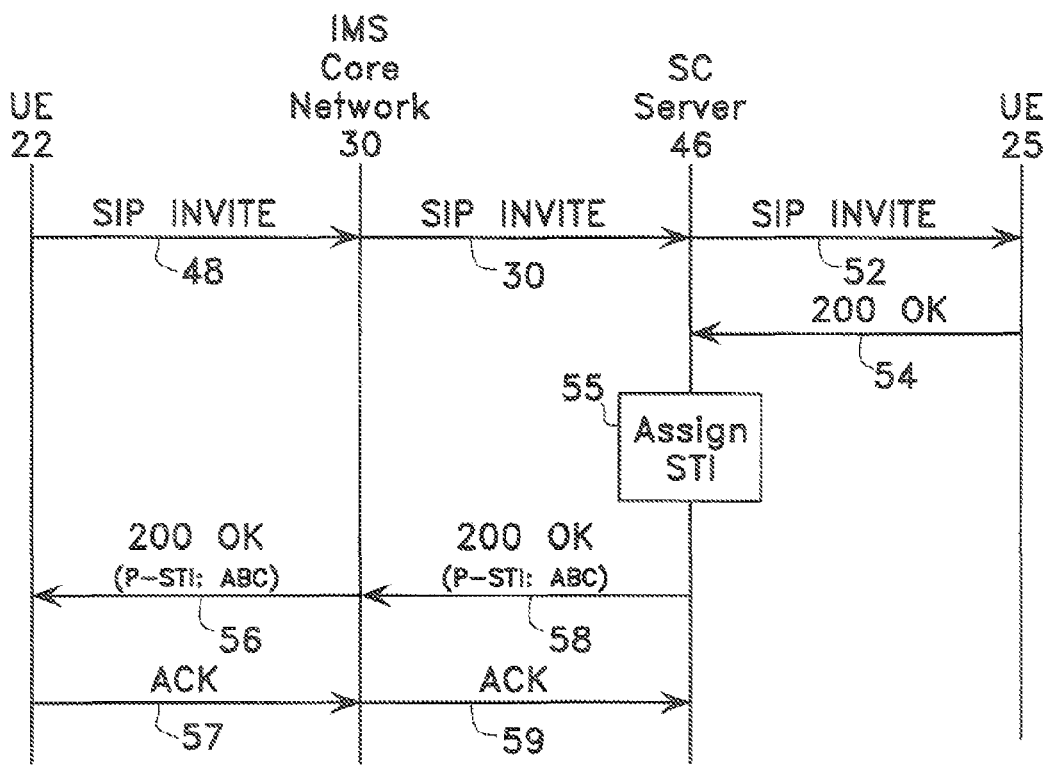
FIG. 2 is a call flow diagram which shows the messages exchanged for identifying the session identity of a communication session among the various entities.

Reference is now directed to FIG. 2 in conjunction with FIG. 1. FIG. 2 is a call flow diagram showing the message and data flows among the various entities in the system 10.

Suppose initially, the UE 22 starts the multimedia IMS session as mentioned above by sending a SIP INVITE message to the IMS core network 30 via the AN 12, as shown by the message path 48 shown in FIG. 2. In the following call flow diagrams, such as FIGS. 2-6, the UEs (e.g., the UEs 22, 25 and 26) access the core network 30 and its entities (e.g., the SC server 46) via the ANs (e.g., the ANs 12, 14 and 16). However, for the sake of clarity, the ANs with their associated message paths are not shown in these call flow diagrams. That is, only the logical message paths in FIGS. 2-6 are shown. The relevant AN for a particular flow will be mentioned when needed in the description. Reference is now returned to FIG. 2. The SIP INVITE message is routed through the SC server 46 via the message path 30 for anchoring purpose and is further sent to the UE 25 via the message path 52, as shown in FIG. 2.

If the UE 25 accepts the multi-component video conference session initiated by the UE 22, the UE 25 sends a 200 OK message back to the SC server 46, via the message path 54.

Upon receipt of the SIP INVITE message via the path 30 or 200 OK message via the path 54, the SC server 46 assigns a STI for the video conference session. The process is signified by the reference numeral 55 in FIG. 2. The purpose of assigning the STI is to allow the UE 22 to refer to this IMS session later if needed to transfer the session, or any component of the session, from one AN to another AN. The STI distinguishes the video conference session between the UE 22 and the UE 25 from other possible sessions that the UE 22 might establish with either the UE 25 or other entities. Furthermore, the assigned STI also distinguishes the current session from other sessions established by other UEs but not communicating with the UE 22, which sessions also pass through the same SC server 46.

In this embodiment, the STI once assigned by the SC server 46 is conveyed to the UE 22 via a SIP response message, such as the 200 OK message sent to the UE 22 through the IMS core network 30 via the AN 12, over the message paths 56 and 58, respectively, as shown in FIG. 2. More specifically, the assigned STI is included in a new SIP header in the 200 OK message. In this particular example, the new SIP header is called "P-STI." It should be noted that other names for the new header can also be used. The P-STI header along with the message content is included in the 200 OK message sent via the message paths 56 and 58 as shown in FIG. 2. In this particular example, the content or value of the STI is labeled "ABC" in FIG. 2. ABC can be the Session Initiation Protocol-Uniform Resource Identifier (SIP-URI) or the telephone URI, or the dialog ID of the SIP session, for example.

It should be noted that if the STI is in the form of the SIP dialog ID, there is no need to have any explicit header such as the "P-STI" header to send the STI to the UE 22 via the SIP message, such as the SIP 200 OK message sent via the paths 56 and 58, since the existent SIP message, such as the SIP 200 OK message, already supports the inclusion of the STI implicitly in different headers.

With the receipt of the STI, the UE 22 can use the STI to request for session transfer later and as will be further described below. Upon receipt of the 200 OK message, the UE 22 can send an acknowledgement message to the SC server 46 via the IMS core network 30 via the message paths 57 and 59, respectively.

Figure 3:
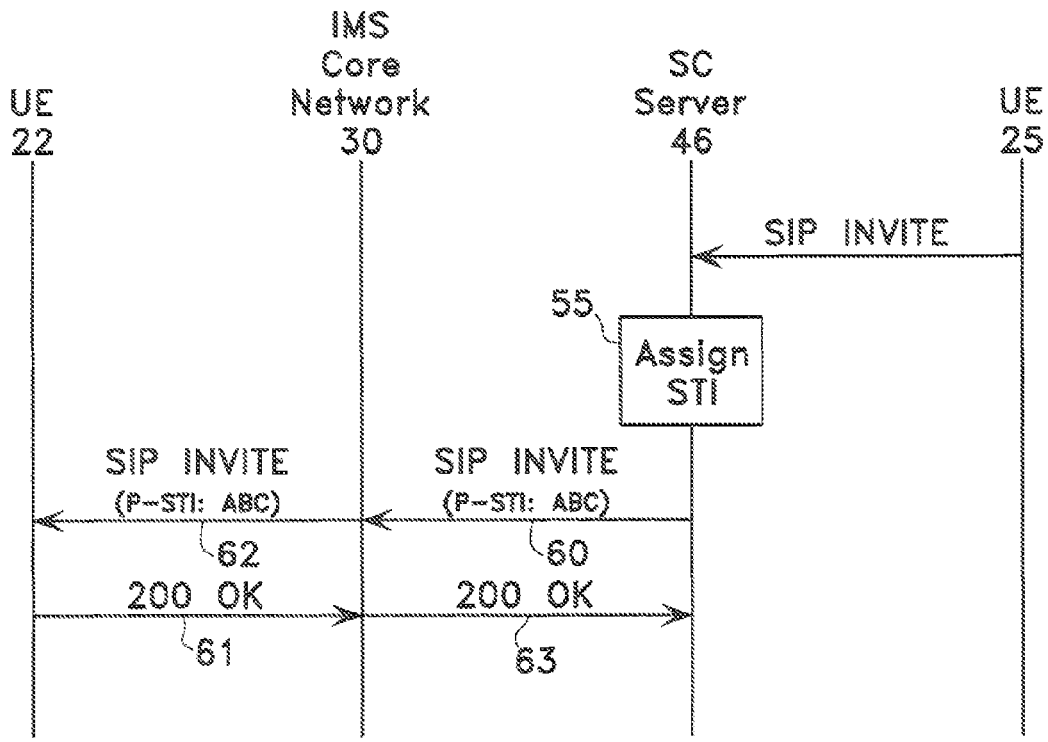
FIG. 3 is another call flow diagram which shows the messages exchanged for identifying the session identity of a communication session among the various entities.

FIG. 3 shows a scenario in which the UE 25 initiates the video conference session instead of the UE 22. Again, once the STI is assigned by the SC server 46 as shown by the process step 55, the STI information can be sent to the UE 22 in the SIP INVITE message sent via the message paths 60 and 62 as shown in FIG. 3. Upon receipt, the UE 22 can send the 200 OK message as acknowledgement via the message paths 61 and 62, as previously described. For the sake of brevity, FIG. 3 is not further elaborated.

It here should be noted that the messages and their flows described in all the embodiments can have variations and further can assume different names. For instances, it is possible for a called UE, e.g., the UE 25 in this case, to send an intermediate message, such as a 18x message, before sending the final 200 OK message.

Reference is now returned to FIG. 2 in conjunction with FIG. 1.

Figure 4:
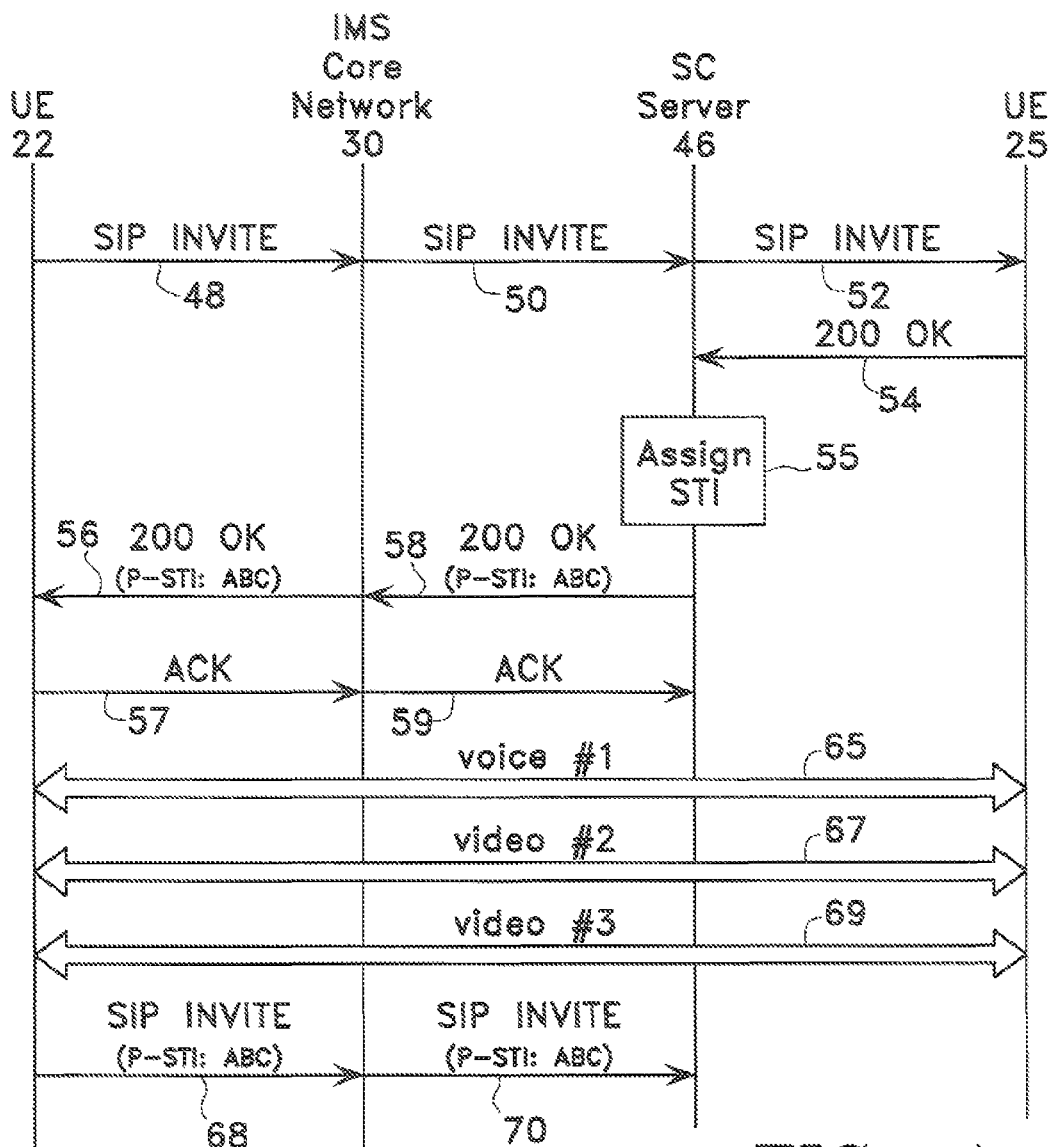
FIG. 4 is a call flow diagram which shows the messages and data exchanged among the various entities after the session identification of the communication session is identified, and the message sent by a user entity to an infrastructure entity to initiate a request for a media component transfer.

Suppose after receipt of the 200 OK message via the message paths 58 and 56, the UE 22 carries out the video conference with the UE 25. In essence, three media components are established. The three media components are denoted by the reference numerals 65, 67 and 69 for the session components voice #1, video #2 and video #3, respectively, as shown in FIG. 4. In FIG. 4, the message flows prior to the establishment of the data tunnels 65, 67 and 69 are duplicated from FIG. 2.

Suppose at a certain time in the midst of the video conference, the UE 22 decides to transfer a communication session component from the AN 12 to the AN 14. There may be many reasons for such a transfer. Exemplary reasons for the transfer may be based on factors such as, loading of the networks, costs, specific policies set by the networks, capabilities of the networks, preference of the UE user, to name just a few.

To initiate the session component transfer, the UE 22 sends a SIP INVITE message to the SC server 26 via the target AN 14 to the core IMS network 30 through the message paths 70 and 68, respectively, as shown in FIG. 4.

If the STI, i.e., the STI with the content value as ABC as shown in FIGS. 2 and 3, is the SIP URI or the telephone URI as in the previous example, then the new SIP header P-STI along with the content value ABC is also included in the SIP INVITE message sent via the paths 68 and 70. As mentioned earlier, other than the SIP URI or the telephone URI, ABC can as can be other IDs, such as a SIP dialog ID. The content of the header P-STI, ABC in this case, assumes the same STI value that was assigned by the SC server 46 via the process step 55 as shown in FIGS. 2-4.

The SC server 46, upon receipt of the SIP INVITE message which includes the STI, can correlate the session transfer request received via the AN 14 with the original session established through the AN 12 in FIGS. 2-4 and perform the required session transfer operation.

If the STI is in the form of, for example, a SIP dialog ID rather than the straightforward SIP URI or telephone URI, several other schemes for conveying the STI to the SC server 46 are possible.

Figure 5:
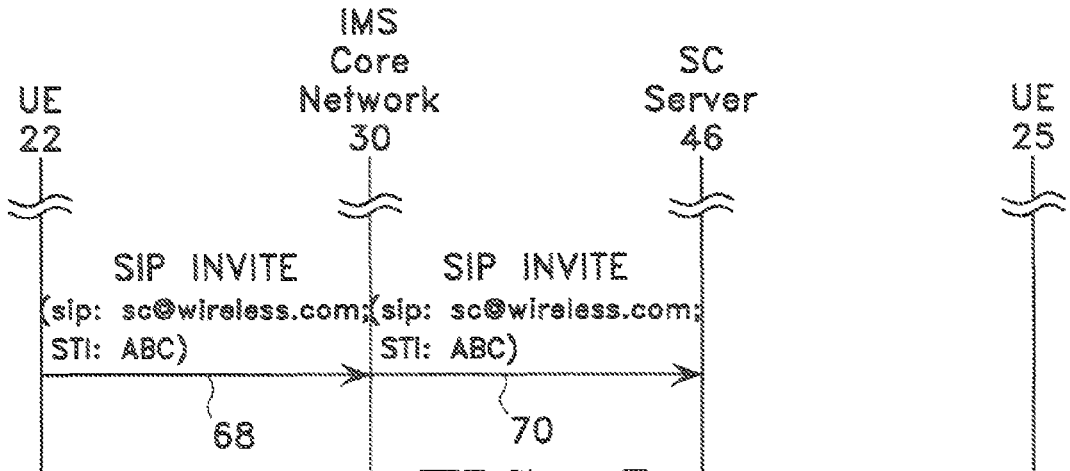
FIGS. 5 and 6 are partial flow diagrams which show alternative ways of sending from the user entity to the infrastructure entity the session identity of the communication session to initiate the request for the media component transfer.

First, in the SIP INVITE message sent via the paths 68 and 70 as shown in FIG. 4, in the Request-URI field of the SIP INVITE header, in addition to the Request-URI specified, additional new URI parameter information can be attached. An example is as shown in FIG. 5 in which paths 68 and 70 are duplicated from FIG. 4 but with a different SIP INVITE message. The specified Request-URI as mentioned above is the IP address "sc@wirelss.com" as shown in FIG. 5. The information "STI:ABC" as shown in FIG. 5 is the additional new URI parameter information attached, that identifies the original session which component is to be transferred.

Figure 6:
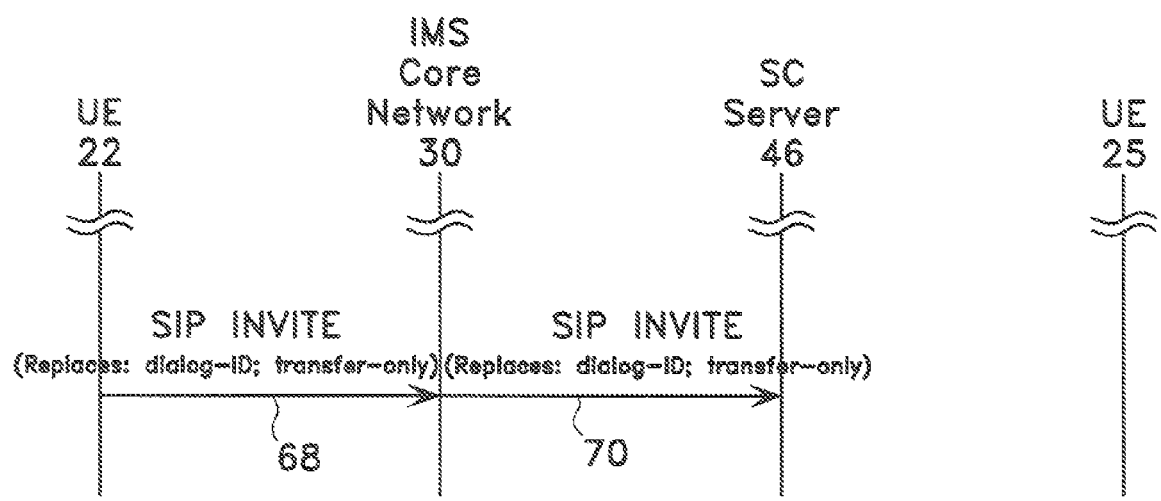

In another scheme, if the SIP dialog ID is used as the STI, then the SIP Replaces header can be used to carry the STI in the session transfer request. In addition, the Replaces header in the header of the SIP INVITE message can be added with a new header parameter. Normally, the Replaces header indicates that the identified session is to be replaced by the session transfer. However, the content of the new header parameter field can carry the information that this SIP request is a request for session transfer (e.g. only transfer part of the media components) instead of replacing. An example is as shown in FIG. 6 in which message paths 68 and 70 are duplicated from FIG. 4 but with a different SIP INVITE message having the header field "Replaces" in which the content includes a new header parameter "transfer-only" to indicate that the identified session is subject to session transfer instead session replacement.

The IMS multimedia session may contain multiple media components as described in the above example. When performing session transfer, the IMS UE may choose to transfer only part of the session to the new access (e.g. video #3 out of the existing voice #1 and video #2). Described below are schemes for the IMS UE to indicate which media components to transfer.

Reference is now returned to FIGS. 1 and 4. Suppose after the three media components 65, 67 and 69 are established, somewhere in the midst of the video conference, the UE 22 decides to transfer part but not the entire communication session from the AN 12 to the AN 14. As an exemplary illustration, suppose the UE 22 wants to transfer the video #3 component from the AN 12 to the AN 14 but maintains the other components video #2 and voice #1. The reason for the transfer may be one or more of the reasons as stated above.

The UE 22 can identify the component to be transferred and inform the SC server 46. Again, there are several possible schemes.

First, included in body part of every SIP INVITE message (e.g., via the path 52) and the 200 OK message (e.g., via the path 54) in FIGS. 2 and 4, or the SIP INVITE (e.g., via the paths 60 and 62) or the 200 OK message (e.g., via the paths 61 and 63) in FIG. 3 are Session Description Protocol (SDP) offer/answer body. The SDP body specifies the property of each media component.

FIG. 7 schematically and partially illustrates a SDP body which shows such an arrangement. FIG. 7 specifically illustrates part of the SDP body of the SIP INVITE messages sent by the UE 22 via the message paths 48, 50 and 52 (FIGS. 2 and 4). In FIG. 7, the letter "m" basically specifies that the line concerns with the description of a media component. For instance, in the first "m" line, among other things, it is specified as an audio component using the port number "1000" of the UE 22. The rest of the line describes the protocol used as that of the Real-time Transport Protocol/Audio Video Profile (RTP/AVP) as specified under RFC 3551 published by the Internet Engineering Task Force (IETF). The codec (Coding and Decoding) of the media component is also set forth.

In a first scheme for session component transfer, the media components in FIG. 7 are associated with designated values or index values, which can be assigned. The assignment of the designated values can be explicit or implicit. An exemplary explicit assignment can be based on a pre-agreed upon methodology, such as based on the order of appearance of the media components in the SDP. For instance, in the audio component, the index "#1" is assigned to this component. One video component is assigned the index "#2" and the other video component is assigned the index "#3". All the entities, such as the SC Server 46 and the UEs 22 and 25, involved with the multi-component session use the same methodology of index value assignment. As such, in this case, both the UE 22 and the SC server 46 are aware of the index values as corresponding to the media components of the SDP body in the originating SIP message such as that shown in FIG. 7. All the involved entities adopt the same assignment scheme thereby providing consistency with offer/answer during subsequent SIP message exchanges.

The designated or index values can also be implicitly assigned. The designated values may not be explicitly carried within the SDP body itself during SIP offer/answer exchanges. However, the SDP bodies of the subsequent SIP messages always maintain the same order of listing of the media components. Each relevant entity, such as the SC Server 46 or the UEs 22 or 25, involved with the multi-component session can derive the designated values from the consistent order of listing of the media components in the subsequent SIP messages, which order of listing is the same as that of the initiating SIP message. For example, as shown in FIG. 7, the audio component with the port number 1000 appears first among the other components. As such, the designated value of #1 can be derived by all the relevant entities. As another example, the video component with the port number 1004 shown in FIG. 7 appears thirdly among the other components in the order of listing. Consequently, the designated value of #3 can be derived by all the entities involved.

Reference is returned to the first scheme of session component transfer. With the index or designated value either explicitly or implicitly assigned, when the UE 22 requests the transfer of one component, the video #3 in this example, the UE 22 can make the SC server 46 aware of such a request by sending the SC server 46 a message which includes the assigned designated value of the component (i.e., #3) within the original session via a new SDP attribute, in this example, "orig-mid," as graphically and exemplarily shown in FIG. 8. In FIG. 8, the attribute line "a" specifies the attribute of the media component immediately above. It should be noted that other names for the new SDP attribute are clearly possible. More specifically, in this example, the UE 22 can include the designated value (i.e., #3) in the SIP INVITE message sent to the SC server 46, such as the message sent via the paths 68 and 70 shown in FIGS. 4-6. The exemplary SIP INVITE message as mentioned is shown in FIG. 8 in which message the SIP body is shown partially with the assigned designated value of the component to be transferred identified as #3 using the new SDP attribute "orig-mid," and the new media line describing the component to be transferred as having a newly assigned port number "2000."

As for the SC server 46, comparing the media descriptions of the previous and newly received SIP INVITE messages and scrutinizing the new attribute of each assigned index of the messages, the server 46 is aware of which component is to be transferred. The SC server 46 then takes action by transferring the indicated component to the new access while maintaining the remaining components on the original access.

In another scheme, instead of the methodology as described above, the UE 22 makes the SC server 46 aware of the components to be transferred by sending the SC server 46 a message without any explicit or implicit index value or any new SDP attribute. Instead, the UE 22 includes in the SDP body description for session transfer in a manner different from the previously described scheme.

Assuming initially the media components are specified in the body of the original SIP INVITE messages sent by the UE 22 via the message paths 48, 50 and 52 (FIGS. 2 and 4) is as shown in FIG. 9.

In this scheme, all the media components in the original session are included in the session transfer request sent via the paths 68 and 70 in the same order as they appear in the SDP agreed upon in the original session. For components that need not be transferred, the UE 22 assigned a predetermined value, e.g. "0", to the port number corresponding to the media components. On the other hand, for components that need to be transferred, the UE 22 assigns the port number as in normal SDP offer/answer handling. Again, the UE 22 can convey such information in the SIP INVITE message, such as the message sent via the paths 68 and 70 shown in FIGS. 4-6. In FIG. 10, the SDP body in the SIP INVITE message sent via the paths 68 and 70 is shown schematically in which in all the media components in the original session are included in the same order. The components that the UE 22 does not intend to be transferred is assigned a predetermined value of "0," whereas, the component intended to be transferred is assigned a normal port number value of, for example, "2008."

Again, for the SC server 46, comparing the media descriptions of the previous and newly received SIP INVITE messages, because the new SIP INVITE requests for session transfer and indicates the predetermined value of 0 for the media components audio #1 and video #2, the SC server 46 understands that these two media components will not be transferred. The SC server 46 then only transfers the video component #3 to the new access, where this media component is assigned a port number "2008."

Figure 11:
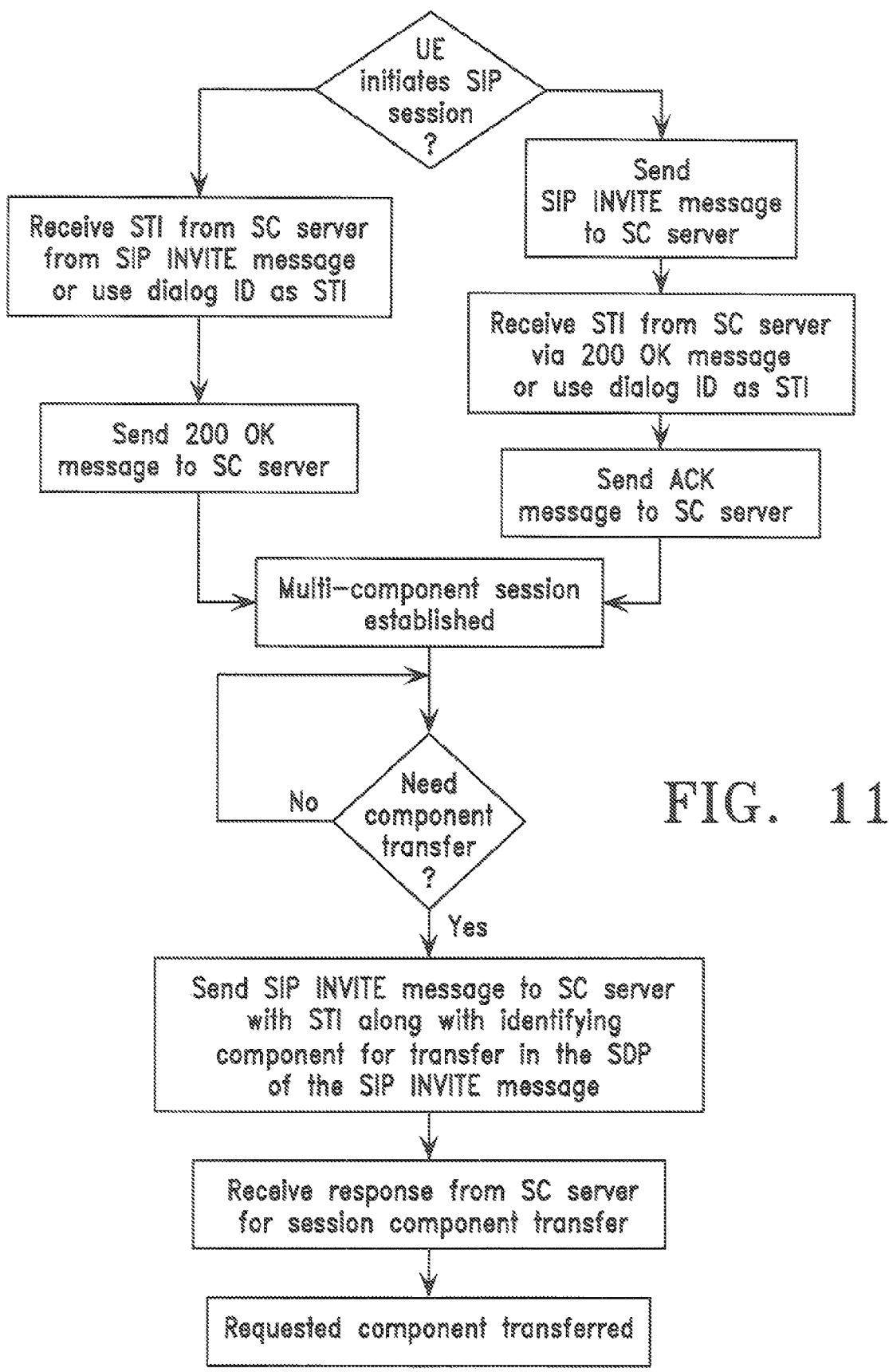
FIG. 11 is a flowchart which generally summaries the process steps involved by a user entity in accordance with the exemplary embodiment.

FIG. 11 is a flowchart which summarizes the processes in the exemplary example described above as executed by a user entity, such as the UE 22.

Figure 12:
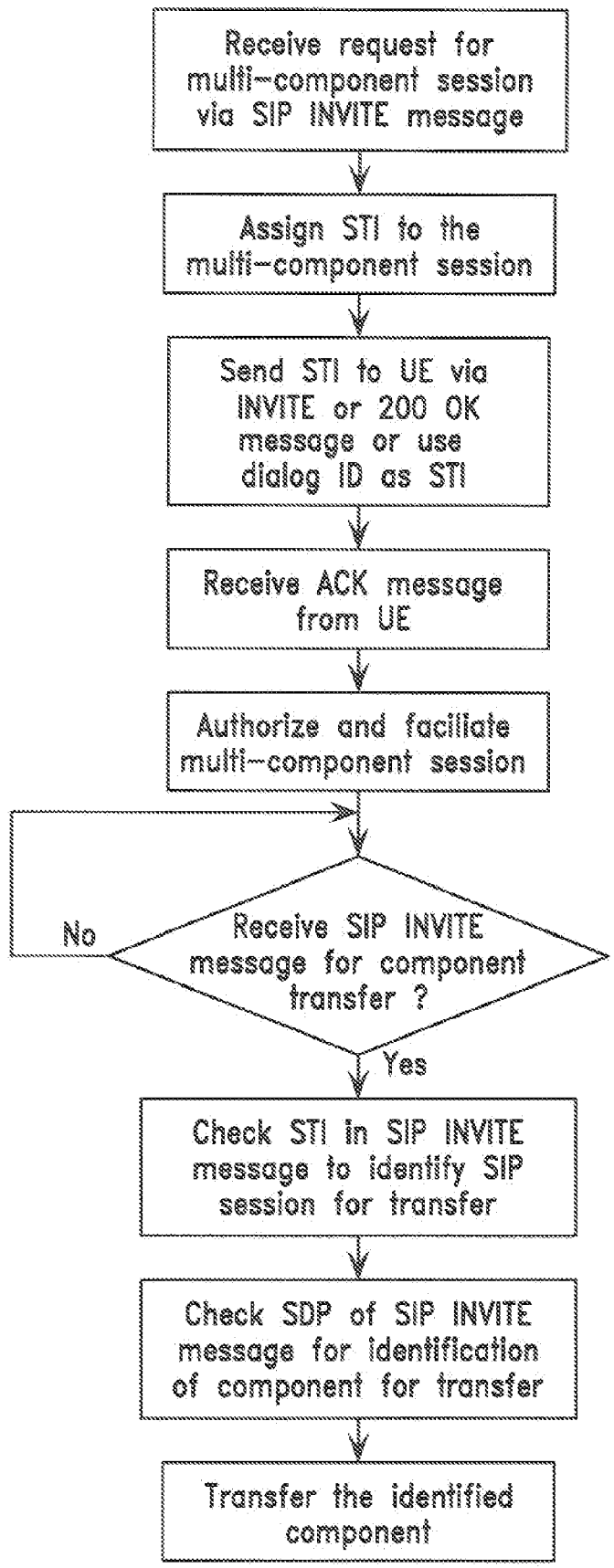
FIG. 12 is another flowchart which generally summaries the process steps involved by a network entity in accordance with the exemplary embodiment.

FIG. 12 is another flowchart which summarizes the processes in the exemplary example described above as executed by a network entity, such as the SC server 46.

Figure 13:
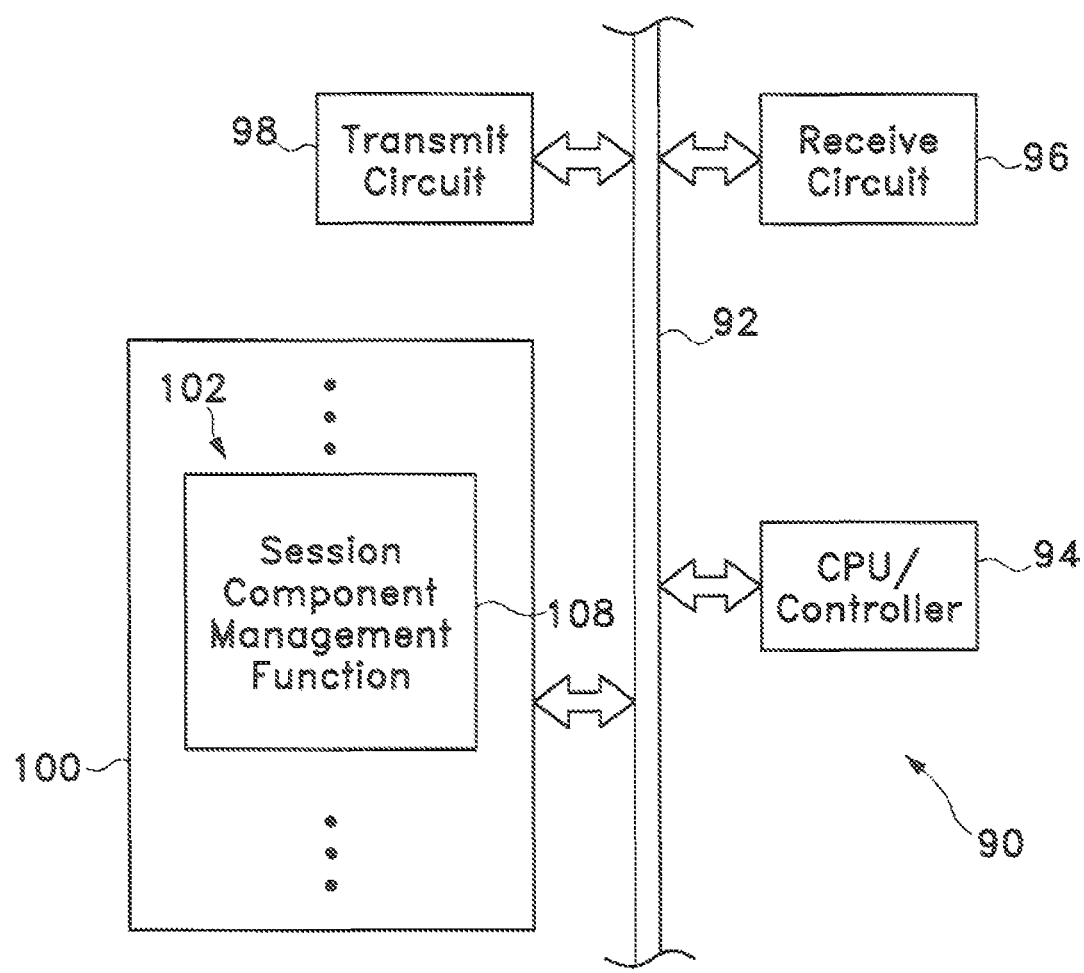
FIG. 13 is a simplified schematic drawing which shows part of the hardware implementation in accordance with the exemplary embodiment.

FIG. 13 shows the part of hardware implementation of an apparatus for executing the schemes or processes as described above. The circuit apparatus is signified by the reference numeral 90 and can be implemented in a user entity, such as the UEs 22 and 25, or a network entity, such as the SC server 46 and other applicable communication entities.

The apparatus 90 comprises a central data bus 92 linking several circuits together. The circuits include a CPU (Central Processing Unit) or a controller 94, a receive circuit 96, a transmit circuit 98, and a memory unit 100.

If the apparatus 90 is part of a wireless device, the receive and transmit circuits 96 and 98 can be connected to a RF (Radio Frequency) circuit but is not shown in the drawing. The receive circuit 96 processes and buffers received signals before sending out to the data bus 92. On the other hand, the transmit circuit 98 processes and buffers the data from the data bus 92 before sending out of the device 90. The CPU/controller 94 performs the function of data management of the data bus 292 and further the function of general data processing, including executing the instructional contents of the memory unit 100.

The memory unit 100 includes a set of modules and/or instructions generally signified by the reference numeral 102. In this embodiment, the modules/instructions include, among other things, a section component management function 108 which carries out the schemes and processes as described above. The function 108 includes computer instructions or code for executing the process steps as shown and described in FIGS. 1-12. Specific instructions particular to an entity can be selectively implemented in the function 108. For instance, if the apparatus 90 is part of a user entity, among other things, instructions particular to the user entity as shown and described in FIG. 1-11 can be coded in the functions 108. Similarly, if the apparatus 90 is part of an infrastructure communication entity or a network entity, for example an SC server, instructions particular to the aspects of the infrastructure entity as shown and described in FIG. 1-10 and 12 can be coded in the function 108.

In this embodiment, the memory unit 100 is a RAM (Random Access Memory) circuit. The exemplary functions, such as the handoff functions 108 and 110, are software routines, modules and/or data sets. The memory unit 100 can be tied to another memory circuit (not shown) which can either be of the volatile or nonvolatile type. As an alternative, the memory unit 300 can be made of other circuit types, such as an EEPROM (Electrically Erasable Programmable Read Only Memory), an EPROM (Electrical Programmable Read Only Memory), a ROM (Read Only Memory), a magnetic disk, an optical disk, and others well known in the art.

Furthermore, the memory unit 100 can be an application specific integrated circuit (ASIC). That is, the instructions or codes in the function 108 can be hard-wired or implemented by hardware, or a combination of hardware and software thereof.

In addition, the memory unit 100 can be a combination of ASIC and memory circuitry built of the volatile type and/or non-volatile type.

It should be further be noted that the inventive processes as described can also be coded as computer-readable instructions carried on any computer-readable medium known in the art. In this disclosure, the term "computer-readable medium" refers to any medium that participates in providing instructions to any processor, such as the CPU/controller 94 shown and described in the drawing figure of FIG. 13, for execution. Such a medium can be of the storage type and may take the form of a volatile or non-volatile storage medium as also described previously, for example, in the description of the memory unit 100 in FIG. 13. Such a medium can also be of the transmission type and may include a coaxial cable, a copper wire, an optical cable, and the air interface carrying acoustic, electromagnetic or optical waves capable of carrying signals readable by machines or computers. The computer-readable medium can be part of a computer product separate from the apparatus 90.

Finally, other changes are possible within the scope of the invention. Other than as described above, any other logical blocks, circuits, and algorithm steps described in connection with the embodiment can be implemented in hardware, software, firmware, or combinations thereof. It will be understood by those skilled in the art that theses and other changes in form and detail may be made therein without departing from the scope and spirit of the invention.

What is claimed is:

1. A method operable by a first user equipment in a communication system, comprising:
   receiving a session identification for a multi-component communication session from an assigning network entity;
   establishing the multi-component communication session with a second user equipment via a first access network, the multi-component communication session including a plurality of session components;
   identifying a component from the plurality of session components as an identified component for transfer;
   sending the session identification to the network entity via a second access network for transfer of the identified component from the plurality of session components from a first path including the first user equipment, the first access network and the second user equipment to a second path including the first user equipment, the second access network and the second user equipment, wherein the first user equipment maintains at least one session component from the plurality of session components with the first access network;

providing information of the identified component to the network entity for the transfer of the identified component from the multi-component communication session;
providing the network entity a designated value for the identified component as the information of the identified component, wherein the designated value is derived from an order of listing of the plurality of session components in a session initiation protocol message, and wherein session initiation protocol messages for the multi-component communication session always maintain the same order of listing of the plurality of session components; and
providing information of a component not being transferred from the plurality of session components to the network entity.

2. The method as in claim 1 further comprising providing the network entity a port number having a zero value for the component not being transferred and another port number having a value different from the zero value as additional information of the identified component for the transfer.

3. The method as in claim 1 wherein the session identification is selected from a group consisting of a SIP-URI (Session Initiation Protocol-Uniform Resource Identification), a telephone URI, and a SIP dialog ID (Identifier).

4. The method as in claim 1, wherein the session identification is received when the multi-component communication session is established.

5. The method as in claim 1, wherein the information of the identified component not being transferred comprises a predetermined value for a port number corresponding to the identified component not being transferred.

6. A computer program product comprising a non-transitory computer-readable medium physically embodied with computer-readable program code for executing the method of claim 1.

7. A method operable by a network entity in a communication system, comprising:
assigning a session identification for a multi-component communication session comprising a first user equipment and a second user equipment, wherein the multi-component communication session includes a plurality of session components;
sending the session identification to the first user equipment;
receiving the session identification from the first user equipment via a second access network for transfer of an identified component from the multi-component communication session from a first path including the first user equipment, a first access network and the second user equipment to a second path including the first user equipment, the second access network and the second user equipment, wherein the first user equipment maintains at least one session component from the plurality of session components with the first access network;
receiving information of the identified component from the first user equipment for the transfer of the identified component from the multi-component communication session;
receiving a designated value for the identified component as the information of the identified component, wherein the designated value is derived from an order of listing of the plurality of session components in a session initiation protocol message, and wherein session initiation protocol messages for the multi-component communication session always maintain the same order of listing of the plurality of session components; and
receiving information of a component not being transferred from the plurality of session components.

8. The method as in claim 7 further comprising receiving from the first user equipment a port number having a zero value for the component not being transferred and another port number having a value different from the zero value for the identified component for the transfer.

9. A computer program product comprising a non-transitory computer-readable medium physically embodied with computer-readable program code for executing the method of claim 7.

10. A first user equipment, comprising:
means for receiving a session identification for a multi-component communication session from an assigning network entity;
means for establishing the multi-component communication session with a second user equipment via a first access network, the multi-component communication session including a plurality of media components;
means for identifying a component from the plurality of media components as an identified component for transfer;
means for sending the session identification to the network entity via a second access network for transfer of the identified component from the plurality of media components from a first path including the first user equipment, the first access network and the second user equipment to a second path including the first user equipment, the second access network and the second user equipment, wherein the first user equipment maintains at least one media component from the plurality of media components with the first access network;
means for providing information of the identified component to the network entity for the transfer of the identified component from the multi-component communication session;
means for providing the network entity a designated value for the identified component as the information of the identified component, wherein the designated value is derived from an order of listing of the plurality of media components in a session initiation protocol message, and wherein session initiation protocol messages for the multi-component communication session always maintain the same order of listing of the plurality of media components; and
means for providing information of a component not being transferred from the plurality of media components to the network entity.

11. The first user equipment as in claim 10 further comprising means for providing the network entity a port number having a zero value for the component not being transferred and another port number having a value different from the zero value as additional information of the identified component for the transfer.

12. The first user equipment as in claim 10 wherein the session identification is selected from a group consisting of a SIP-URI (Session Initiation Protocol-Uniform Resource Identification), a telephone URI, and a SIP dialog ID (Identifier).

13. An infrastructure equipment, comprising:
means for assigning a session identification for a multi-component communication session comprising a first user equipment and a second user equipment, wherein the multi-component communication session includes a plurality of media components;
means for sending the session identification to the first user equipment;

means for receiving the session identification from the first user equipment via a second access network for transfer of an identified component from the multi-component communication session from a first path including the first user equipment, a first access network and the second user equipment to a second path including the first user equipment, the second access network and the second user equipment, wherein the first user equipment maintains at least one media component from the plurality of media components with the first access network;

means for receiving information of the identified component from the first user equipment for the transfer of the identified component from the multi-component communication session;

means for receiving a designated value for the identified component as the information of the identified component, wherein the designated value is derived from an order of listing of the plurality of media components in a session initiation protocol message, and wherein session initiation protocol messages for the multi-component communication session always maintain the same order of listing of the plurality of media components; and means for receiving information of a component not being transferred from the plurality of media components.

14. The infrastructure equipment as in claim 13 further comprising means for receiving from the first user equipment a port number having a zero value for the component not being transferred and another port number having a value different from the zero value for the identified component for the transfer.

15. A first user apparatus, comprising:
a processor; and
circuitry coupled to the processor configured to receive a session identification for a multi-component communication session from an assigning network entity, establish the multi-component communication session with a second user apparatus via a first access network, the multi-component communication session including a plurality of media components, identify a component from the plurality of media components as an identified component for transfer, send the session identification to the network entity via a second access network for transfer of the identified component from the plurality of media components from a first path including the first user apparatus, the first access network, and the second user apparatus to a second path including the first user apparatus, the second access network and the second user apparatus, wherein the first user apparatus maintains at least one media component from the plurality of media components with the first access network, the circuitry being additionally configured to provide information of the identified component to the network entity for the transfer of the identified component from the multi-component communication session, and provide the network entity a designated value for the identified component as the information of the identified component, wherein the designated value is derived from an order of listing of the plurality of media components in a session initiation protocol message, wherein session initiation protocol messages for the multi-component communication session always maintain the same order of listing of the plurality of media components, the circuitry being additionally configured to provide information of a component not being transferred from the plurality of media components to the network entity.

16. The first user apparatus as in claim 15, wherein the processor and the circuitry are further configured to provide the network entity a port number having a zero value for the component not being transferred and another port number having a value different from the zero value as additional information of the identified component for the transfer.

17. The first user apparatus as in claim 15 wherein the session identification is selected from a group consisting of a SIP-URI (Session Initiation Protocol-Uniform Resource Identification), a telephone URI, and a SIP dialog ID (Identifier).

18. An infrastructure apparatus, comprising:
a processor; and
circuitry coupled to the processor configured to assign a session identification for a multi-component communication session comprising a first user equipment and a second user equipment, wherein the multi-component communication session includes a plurality of media components, wherein the circuitry is also configured to send the session identification to the first user equipment, receive the session identification from the first user equipment via a second access network for transfer of an identified component from the multi-component communication session from a first path including the first user equipment, a first access network and the second user equipment to a second path including the first user equipment, the second access network and the second user equipment, wherein the first user equipment maintains at least one media component from the plurality of media components with the first access network, the circuitry additionally being configured to receive information of the identified component from the first user equipment for the transfer of the identified component from the multi-component communication session, and receive a designated value for the identified component as the information of the identified component, wherein the designated value is derived from an order of listing of the plurality of media components in a session initiation protocol message, and wherein session initiation protocol messages for the multi-component communication session always maintain the same order of listing of the plurality of media components, the circuitry being additionally configured to receive information of a component not being transferred from the plurality of media components.

19. The infrastructure apparatus as in claim 18 wherein the processor and the circuitry are further configured to receive from the first user equipment a port number having a zero value for the component not being transferred and another port number having a value different from the zero value for the identified component for the transfer.

* * * * *